Patented Nov. 17, 1931

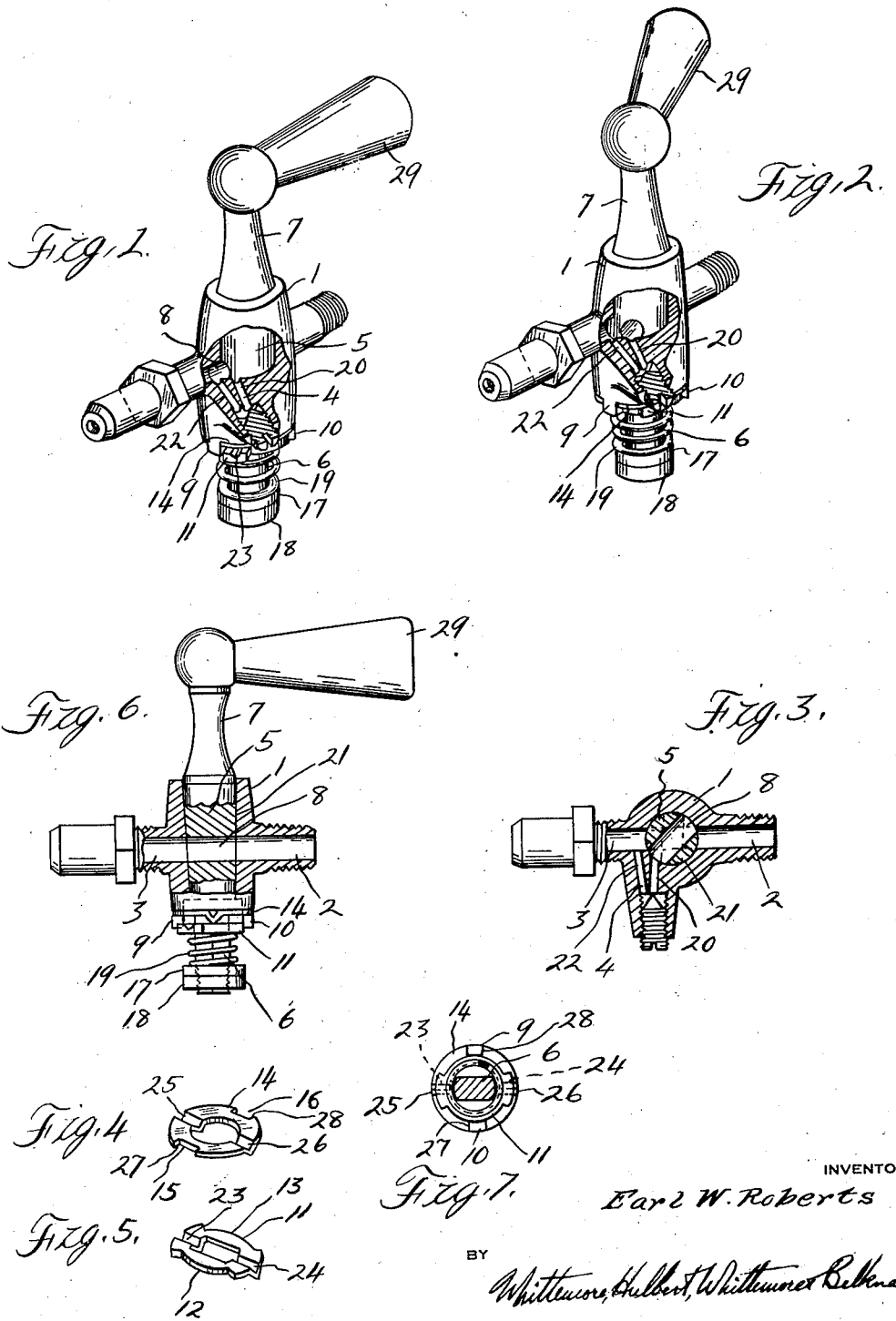

1,832,426

UNITED STATES PATENT OFFICE

EARL W. ROBERTS, OF DETROIT, MICHIGAN, ASSIGNOR TO ROBERTS BRASS MANUFACTURING COMPANY, OF DETROIT, MICHIGAN, A CORPORATION OF MICHIGAN

VALVE ASSEMBLY

Application filed November 19, 1928. Serial No. 320,476.

This invention relates generally to valve assemblies, especially gas cocks of the rotary plug type and refers more particularly to an efficient and durable means for holding the rotary plugs of such devices in predetermined positions so as to prevent accidental movement thereof.

Heretofore the rotary plugs of gas cocks have carried latch washers below the lower ends of the plug casings and such washers have had upstanding projections or raised portions that engaged downwardly opening recesses in the lower ends of the casings to hold the plugs in closed position. However when such washers are used to any great extent the upstanding projections wore down and rounded off the edges of the recesses with the result that the rotary plugs carrying the washers would not be properly held in closed position. Moreover due to the recesses being formed in the lower ends of the plug casings, such casings as a whole had to be replaced when the edges of the recesses therein became inoperative for holding the projections on the washers carried by the plugs.

With the present invention such objectionable features and expensive replacements have been obviated and the rotary plug is preferably held in an intermediate by-pass registering position by the provision of cooperating parts that are associated with the plug and casing in such a way that they may be replaced without disassembling the plug and casing.

In the accompanying drawings:

Figure 1 is a perspective view of a valve assembly embodying my invention with portions of the valve casing broken away and showing the transverse passage in the plug registering with the inlet and outlet ports in the casing;

Figure 2 is a view similar to Figure 1 but showing the transverse passage in the plug registering with the inlet port and by-pass;

Figure 3 is a horizontal sectional view taken on a line in the plane of the inlet and outlet ports;

Figure 4 is a detail view of the stop washer;

Figure 5 is a detail view of the latch washer;

Fig. 6 is a longitudinal section through the valve;

Fig. 7 is a detail of the stop and latch washers as applied to the valve;

Referring now to the drawings, 1 is a valve casing having laterally opening inlet and outlet ports 2 and 3 respectively and an intermediate restricted by-pass 4; 5 is a rotary plug in the casing 1 and having stem extensions 6 and 7 at its opposite ends projecting above and below the valve casing, and having a transverse passage or bore 8 intermediate of its ends adapted to register with the inlet and outlet ports 2 and 3 in the valve casing; 9 and 10 are integral lugs projecting downwardly from the lower end of the casing 1 at diametrically opposite points thereof, 11 is a stop washer non-rotatably sleeved on the stem 6 and having segmental recesses 12 and 13 at diametrically opposite points thereof receiving the lugs 9 and 10 whereby engagement of the ends of the recesses 12 and 13 with the lugs 9 and 10 will limit the rotative movement of the plug 5 in opposite directions and thereby cause the transverse passage 8 therein to be alternately in and out of registration with the inlet and outlet ports 2 and 3 and with the inlet port 2 and by-pass 4; 14 is a latch washer freely surrounding the stem 6 and having slots 15 and 16 at diametrically opposite points receiving the lugs 9 and 10; 17 and 18 respectively are nuts threaded upon the stem 6 at the lower end thereof, and 19 is a coil spring surrounding the stem 6 between the uppermost nut 17 and the stop washer 11 and pressing the washers 11 and 14 upwardly and retaining the same in operative position with respect to the valve casing and depending lugs 9 and 10 thereof.

As shown the by-pass 4 is V-shape in form with the inlet end 20 thereof opening into the central longitudinal bore 21 of the valve casing for registration with the passage 8 in the plug 5 when the latter is in an intermediate position, and with the outlet end 22 thereof opening into the outlet port 3 whereby when the passage 8 in the plug 5 registers with the inlet end 20 of the by-pass 4 the fluid entering the inlet port 2 of the casing will flow through the passage 8 in the plug into the by-pass 4 and thence into the outlet port 3. When the plug is in this position direct communication between the inlet and outlet ports 2 and 3 is cut off. However the passage 8 still communicates with the inlet port 2 as clearly illustrated in Figure 3 of the accompanying drawings. Thus when the assembly is used as a gas cock, the flow of gas to the outlet port 3 may be either high or low or entirely cut off depending upon the position of the plug 5 and passage 8 therein with respect to the ports 2 and 3 and by-pass 4.

The latch washer 14 abuts the lower end of the casing 1 and is provided at diametrically opposite points thereof with depending V-shaped projections or depressed portions 25 and 26 that are engageable with correspondingly shaped recesses or grooves 23 and 24 in the upper face of the stop washer 11. Preferably these depressions 25 and 26 are in a plane at right angles to the plane of the lugs 9 and 10 and the grooves 23 and 24 are in the plane of the shoulders 27 and 28 provided by the segmental recesses 12 and 13 in the stop washer 11 so that the grooves 23 and 24 will be engaged by the depressions 25 and 26 when the passage 8 in the plug 5 registers with the inlet port 2 and by-pass 4.

In use the plug 5 may be turned freely by a suitable operating handle 29 carried by the stem 7 to fully open or closed positions yet is capable of being automatically and effectively held in the intermediate by-pass registering position by the engagement of the depressions 25 and 26 with the grooves 23 and 24. Even in fully open or closed positions the frictional engagement between the depressions 25 and 26 and the upper flat face of the stop washer 11 caused by the upward spring 19 pressure is such that the plug 5 will be effectively held in adjusted position.

Thus, from the foregoing description, it will be apparent that I have provided a very practical and useful means for holding the rotary plug in a predetermined position and that such means is readily renewable without disturbing the plug or casing. Such renewable parts may be easily and cheaply manufactured and may be readily assembled or taken apart. It will also be noted that the latch washer 14 prevents wear on the casing 1 and the stop washer 11 serves the dual function of cooperating with the washer 14 to hold the plug and of cooperating with the lugs 9 and 10 to limit rotation of the plug. Moreover it will be noted that the lugs 9 and 10 constitute splines for the latch washer 14 as well as stops for the stop washer 11 and plug 5.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention:

1. In a valve assembly, the combination with a valve casing, and a rotary plug in said casing, of means for holding said plug in a predetermined position of rotation with respect to said casing including cooperating parts on the plug, one of said parts being fixed with respect to the plug, the other of said parts being free with respect to said plug, and a projection on the casing constituting a spline for the free part and having a portion in the path of and serving as a stop for the part rigid with the plug.

2. In a valve assembly, a valve casing having spaced lugs at one end thereof, a rotary valve in the casing having a stem adjacent said lugs, an element carried by the stem in spaced relation to the casing, washers on the stem between said element and casing and having cooperating clutch portions, one of said washers being held by said lugs against rotation relative to the casing, the other of said washers having recesses receiving said lugs whereby it is adapted to move in the arc of a circle between said lugs but will be stopped by said lugs, and yieldable means between said element and last mentioned washer for holding the washers in operative engagement with one another and in operative relation to said lugs.

In testimony whereof I affix my signature.

EARL W. ROBERTS.